United States Patent
Fujita et al.

(10) Patent No.: US 9,970,116 B2
(45) Date of Patent: May 15, 2018

(54) AL-PLATED STEEL SHEET USED FOR HOT PRESSING AND METHOD FOR MANUFACTURING AL-PLATED STEEL SHEET USED FOR HOT PRESSING

(71) Applicant: NIPPON STEEL & SUMITOMO METAL CORPORATION, Tokyo (JP)

(72) Inventors: Soshi Fujita, Tokyo (JP); Shintaro Yamanaka, Tokyo (JP); Jun Maki, Tokyo (JP); Hiroki Fujimoto, Tokyo (JP); Hatsuhiko Oikawa, Tokyo (JP); Hideaki Irikawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days. days.

(21) Appl. No.: 15/103,152

(22) PCT Filed: Dec. 10, 2014

(86) PCT No.: PCT/JP2014/082708
§ 371 (c)(1),
(2) Date: Jun. 9, 2016

(87) PCT Pub. No.: WO2015/087921
PCT Pub. Date: Jun. 18, 2015

(65) Prior Publication Data
US 2016/0362794 A1    Dec. 15, 2016

(30) Foreign Application Priority Data

Dec. 12, 2013    (JP) ................................ 2013-257106

(51) Int. Cl.
*B32B 15/04*    (2006.01)
*C23C 22/66*    (2006.01)
(Continued)

(52) U.S. Cl.
CPC ............ *C23C 22/66* (2013.01); *B21D 22/022* (2013.01); *B21D 35/005* (2013.01);
(Continued)

(58) Field of Classification Search
None
See application file for complete search history.

(56) References Cited

U.S. PATENT DOCUMENTS 6,296,805 B1    10/2001    Laurent et al.
2011/0030441 A1    2/2011    Maki et al.
(Continued)

FOREIGN PATENT DOCUMENTS

CA    2 864 392 A1    8/2013
EP    0 653 502 A2    5/1995
(Continued)

OTHER PUBLICATIONS

International Search Report issued in PCT/JP2014/082708, dated Mar. 3, 2015.
(Continued)

*Primary Examiner* — Seth Dumbris
(74) *Attorney, Agent, or Firm* — Birch, Stewart, Kolasch & Birch, LLP

(57) ABSTRACT

Provided is an Al-plated steel sheet used for hot pressing that has excellent lubricity in hot state, corrosion resistance after paint coating, and spot weldability. An Al-plated steel sheet used for hot pressing includes: a steel sheet; an Al plating layer formed on one surface or both surfaces of the steel sheet; and a surface coating layer formed on the Al plating layer. The surface coating layer contains a zinc compound, and the zinc compound is deposited on the Al-plated steel sheet in an amount of equal to or greater than 0.3 $g/m^2$ and equal to or less than 1.5 $g/m^2$ as an amount of metallic zinc
(Continued)

per one surface, and a zinc deposition amount in any continuous 1 mm² region is 1.5 g/m² or less.

11 Claims, 1 Drawing Sheet

(51) Int. Cl.

| | | |
|---|---|---|
| C23C 2/12 | (2006.01) | |
| C23C 2/28 | (2006.01) | |
| C23C 2/40 | (2006.01) | |
| C22C 21/02 | (2006.01) | |
| C22C 38/00 | (2006.01) | |
| C22C 38/38 | (2006.01) | |
| B21D 22/02 | (2006.01) | |
| B21D 35/00 | (2006.01) | |
| C22C 21/00 | (2006.01) | |
| B32B 15/01 | (2006.01) | |
| C22C 38/02 | (2006.01) | |
| C22C 38/04 | (2006.01) | |
| C22C 38/06 | (2006.01) | |
| C22C 38/12 | (2006.01) | |
| C22C 38/14 | (2006.01) | |
| C22C 38/18 | (2006.01) | |
| C23C 2/20 | (2006.01) | |

(52) U.S. Cl.
CPC ............ *B32B 15/012* (2013.01); *C22C 21/00* (2013.01); *C22C 21/02* (2013.01); *C22C 38/00* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C22C 38/38* (2013.01); *C23C 2/12* (2013.01); *C23C 2/20* (2013.01); *C23C 2/28* (2013.01); *C23C 2/40* (2013.01); *Y10T 428/12611* (2015.01); *Y10T 428/12757* (2015.01)

(56) References Cited

U.S. PATENT DOCUMENTS

| | | |
|---|---|---|
| 2012/0073351 A1 | 3/2012 | Maki et al. |
| 2015/0020562 A1 | 1/2015 | Yamanaka et al. |

FOREIGN PATENT DOCUMENTS

| | | | | |
|---|---|---|---|---|
| JP | 6-55129 A | 3/1994 | | |
| JP | 2000-38640 A | 2/2000 | | |
| JP | 2001-220690 A | 8/2001 | | |
| JP | 2004027263 * | 1/2004 | ............... | C23C 2/06 |
| JP | 2004-211151 A | 7/2004 | | |
| JP | 2010-188317 A | 9/2010 | | |
| JP | 2011-149084 A | 8/2011 | | |
| JP | 2013-151734 A | 8/2013 | | |
| JP | 2013-221202 A | 10/2013 | | |
| JP | 2013-227620 A | 11/2013 | | |
| RU | 2 466 210 C2 | 5/2012 | | |
| WO | WO 2009/131233 A1 | 10/2009 | | |
| WO | WO 2012/137687 A1 | 10/2012 | | |
| WO | WO 2013/122004 A1 | 8/2013 | | |

OTHER PUBLICATIONS

Written Opinion of the International Searching Authority issued in PCT/JP2014/082708 (PCT/ISA/237), dated Mar. 3, 2015.
Chinese Office Action and Search Report, dated Jul. 3, 2017, for Chinese Application No. 201480067715.7, with a partial English translation of the Chinese Office Action.
Second Office Action dated Aug. 9, 2016, in Taiwan Patent Application No. 104102706, with partial English translation.
Extended European Search Report dated Jun. 21, 2017, in European Patent Application No. 14869603.2.
Office Action dated Sep. 1, 2017, in Taiwan Patent Application No. 10626897030, with partial English translation.
Official Action dated Oct. 3, 2017, in Russian Patent Application No. 201612205420 (034504), with English translation.

* cited by examiner

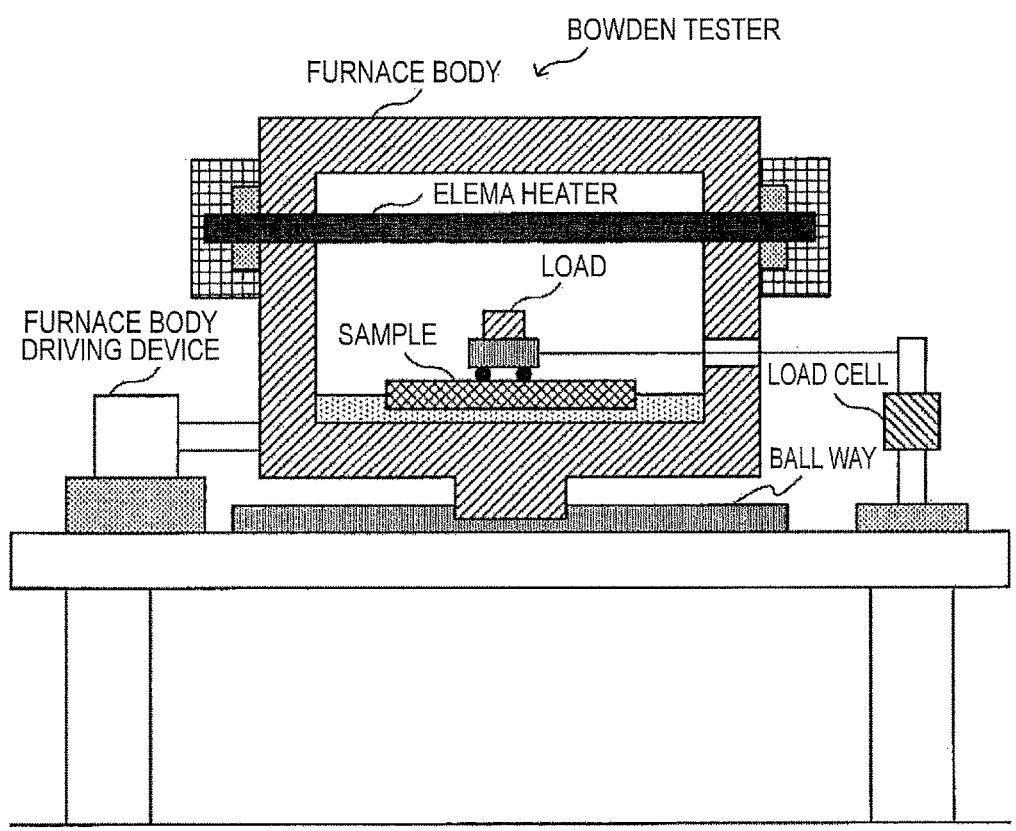

AL-PLATED STEEL SHEET USED FOR HOT PRESSING AND METHOD FOR MANUFACTURING AL-PLATED STEEL SHEET USED FOR HOT PRESSING

TECHNICAL FIELD

The present invention relates to a plated steel sheet used for hot pressing that has an Al plating cover mainly made of Al, and a method for manufacturing an Al-plated steel sheet used for hot pressing.

BACKGROUND ART

In recent years, it has been increasingly demanded to suppress the consumption of fossil fuels in order to prevent global warming and protect the environment, which has affected various manufacturing industries. For example, automobiles, which are an indispensable part of transportation means in daily life and activities, are not an exception. There is a demand to improve fuel economy by, for example, reducing vehicle body weight. It is not allowed for automobiles, however, to simply reduce the vehicle body weight in terms of product functions. It is necessary to secure appropriate safety.

Many of the structural parts of an automobile are made of an iron-based material (in particular, a steel sheet). For reducing the vehicle body weight, it is important to reduce the weight of the steel sheet. Instead of simply reducing the weight of the steel sheet, which is not allowed as mentioned above, the weight reduction must be accompanied with securing the mechanical strength of the steel sheet. Such demand arises not only in the car manufacturing industry but also in various other manufacturing industries. Research and development efforts have been directed to a steel sheet that can have, due to improved mechanical strength, the same or a higher mechanical strength as compared with a conventional one even when the sheet is made thinner.

In general, a material having a high mechanical strength tends to become lower in shape fixability in shape formation work such as bending. It is difficult to form such material into a complicated shape. One of the solutions to the formability problem is what is called a "hot pressing method (also referred to as hot stamping, hot pressing, or die quenching)". In the hot pressing method, a material to be formed is heated temporarily to a high temperature and the steel sheet softened by the heating is formed by pressing, and then the steel sheet is cooled. By using the hot pressing method, the material is once softened by heating to a high temperature, so that the material is easy to press. Furthermore, the mechanical strength of the material becomes higher due to a quenching effect during cooling after the shaping. Accordingly, the hot pressing method can provide a product having both a favorable shape fixability and a high mechanical strength.

When the hot pressing method is applied to a steel sheet, however, the surface of the steel sheet is oxidized to generate scales (compounds) due to heating the steel sheet to a high temperature of 800° C. or higher. Accordingly, a process to remove the scales (descaling process) is necessary after hot pressing, which deteriorates productivity. For the members and the like that require corrosion resistance, it is necessary to carry out anti-corrosion treatment and metal cover installation treatment on the surfaces of the members after the work process. A surface cleaning process and a surface treatment process are also necessary, which further deteriorates productivity.

As an example of a method for suppressing such deterioration in productivity, a covering layer can be installed on a steel sheet. In general, various materials including organic and inorganic materials are used for the covering layer on a steel sheet. Especially, galvanized steel sheets that have a sacrificial protection effect on steel sheets are widely used for steel sheets for automobiles and other products because the galvanized steel sheets provide anti-corrosion performance and suitability to steel sheet production technology. However, this may cause considerable deterioration in the surface properties because heating temperatures used in the hot pressing (700 to 1000° C.) are higher than the temperatures at which the organic materials decompose or the metal (e.g., zinc) melts or boils, so that the surface coating and the plating layer evaporate at the time of heating by hot pressing.

For this reason, it is desirable to use a steel sheet having an Al-based metal cover that has the boiling point higher than that of an organic material cover or a zinc-based metal cover (i.e., an Al-plated steel sheet) for the hot pressing method that involves high temperature heating.

The Al-based metal cover can prevent scales from being generated on the surface of the steel sheet, which leads to omitting a process such as descaling and improving the productivity of products. The Al-based metal cover also has an anti-corrosion effect and thus improves corrosion resistance. Patent Literature 1 below discloses a method in which hot pressing is performed on a steel sheet obtained by covering a steel sheet having a predetermined component composition with Al-based metal.

However, in the case where the Al-based metal cover is applied as in Patent Literature 1, the Al cover is melted and then an Al—Fe alloy layer is generated due to the dispersion of Fe from the steel sheet, depending on preheating conditions before hot pressing. Furthermore, the Al—Fe alloy layer grows until the Al—Fe alloy layer reaches the surface of the steel sheet in some cases. This Al—Fe alloy layer is so hard that there is a problem in that scratches are formed in the product by contacting with dies during the pressing work.

The Al—Fe alloy layer is not smooth on the surface and is inferior in lubricity. In addition, since the Al—Fe alloy layer is hard and tends to break, cracks are developed in a plating layer and powdering occurs, for example, resulting in lower formability. Moreover, flaked materials from the Al—Fe alloy layer and coming-off materials by strong abrasion on the surface of the Al—Fe alloy layer of the steel sheet attach on the dies. The Al—Fe intermetallic compound caused by the Al—Fe alloy layer then adheres to the dies, which leads to deterioration in the quality of products. To prevent this, it is necessary to periodically remove the Al—Fe intermetallic compound adhered to the dies, which is one of the causes for lowering the productivity of products and increasing the production cost.

Furthermore, the Al—Fe alloy layer is less reactive in phosphate treatment. Therefore, a chemical conversion coating (a phosphate coating), which is a treatment before electrodeposition coating, cannot be generated on the surface of the Al—Fe alloy layer. Even when a chemical conversion coating is not generated, corrosion resistance after paint coating would be favorable if adhesion with paint is favorable and Al deposition amount is large enough. However, an increase in Al deposition amount leads to a larger amount of the Al—Fe intermetallic compound adhered to the dies.

The adhesion of the Al—Fe intermetallic compound includes the case where the flaked materials from the Al—Fe alloy layer attach on the dies and the case where the coming-off materials by strong abrasion on the surface of the Al—Fe alloy layer attach on the dies. In performing hot pressing on a steel sheet having a surface coating, an increase in lubricity makes an improvement for the case where coming-off materials by strong abrasion on the surface of the Al—Fe alloy layer attach on the dies, but this increase in lubricity is not effective for an improvement for the case where flaked materials from the Al—Fe alloy layer attach on the dies. To alleviate the attachment of the flaked materials from the Al—Fe alloy layer on the dies, it is most effective to lower the Al deposition amount in the Al plating. However, lowering the Al deposition amount causes deterioration in the corrosion resistance.

Hence, Patent Literature 2 below discloses a steel sheet with an objective to prevent scratches from occurring in a product during work. In the steel sheet disclosed in Patent Literature 2, an Al-based metal cover is formed on the surface of a steel sheet having a predetermined component composition, and, on the surface of the Al-based metal cover, there is formed a coating made of an inorganic compound containing at least one of Si, Zr, Ti, and P, an organic compound, or a complex compound thereof. For the steel sheet with a surface coating formed thereon as disclosed in Patent Literature 2, the surface coating does not come off during pressing after heating, so that the surface coating can prevent scratches from being formed during pressing.

Patent Literature 3 below discloses a method in which a wurtzite compound, particularly zinc oxide, is formed on the surface of an Al-plated steel sheet. The method disclosed in Patent Literature 3 is a method that improves lubricity in hot state and chemical conversion treatability, and adds a binder component to a surface coating in order to secure the adhesion of the surface coating before hot pressing.

CITATION LIST

Patent Literature

Patent Literature 1: JP 2000-38640A
Patent Literature 2: JP 2004-211151A
Patent Literature 3: WO 2009/131233

SUMMARY OF INVENTION

Technical Problem

Unfortunately, the surface coating disclosed in Patent Literature 2 cannot provide enough lubricity during pressing, and there is a demand to improve a lubricant, for example. In addition, for the method disclosed in Patent Literature 3, zinc oxide itself does not have enough electrical conductivity, which tends to deteriorate spot weldability.

The present invention has been made in view of such circumstances, and aims to provide an Al-plated steel sheet used for hot pressing and a method for manufacturing an Al-plated steel sheet used for hot pressing that provide excellent lubricity in hot state, corrosion resistance after paint coating, and spot weldability.

Solution to Problem

Based on the results of intensive studies to solve the aforementioned problems, the present inventors have found that by uniformly depositing a zinc compound, particularly zinc oxide, with a deposition amount within a certain range on a surface of an Al-plated steel sheet, it is possible to significantly improve spot weldability while securing lubricity in hot state and corrosion resistance after paint coating.

The gist of the present invention based on this finding is described as follows.

(1)

An Al-plated steel sheet used for hot pressing, including:
a steel sheet;
an Al plating layer formed on one surface or both surfaces of the steel sheet; and
a surface coating layer formed on the Al plating layer,
wherein the surface coating layer contains a zinc compound, and the zinc compound is deposited on the Al-plated steel sheet in an amount of equal to or greater than 0.3 $g/m^2$ and equal to or less than 1.5 $g/m^2$ as an amount of metallic zinc per one surface, and a zinc deposition amount in any continuous 1 $mm^2$ region is 1.5 $g/m^2$ or less.

(2)

The Al-plated steel sheet used for hot pressing according to (1), wherein the zinc compound in the surface coating layer is zinc oxide.

(3)

The Al-plated steel sheet used for hot pressing according to (1) or (2),
wherein an average length RSm of a profile element in a roughness curve of a surface of the Al-plated steel sheet used for hot pressing after the formation of the surface coating layer is 500 μm or less.

(4)

A method for manufacturing an Al-plated steel sheet used for hot pressing, including the steps of:
applying an application liquid containing a zinc compound and having a contact angle of equal to or greater than 20° and equal to or less than 50° with respect to the Al-plated steel sheet onto the Al-plated steel sheet including a steel sheet and the Al plating layer formed on one surface or both surfaces of the steel sheet; and
drying the Al-plated steel sheet onto which the application liquid has been applied, at a peak metal temperature of equal to or higher than 60° C. and equal to or lower than 200° C., to form a surface coating layer containing the zinc compound on the Al plating layer.

(5)

The method for manufacturing an Al-plated steel sheet used for hot pressing according to (4),
wherein a surface tension of the application liquid at 25° C. is equal to or greater than 20 mN/m and equal to or less than 60 mN/m.

(6)

The method for manufacturing an Al-plated steel sheet used for hot pressing according to (4) or (5), wherein a viscosity of the application liquid at 25° C. is equal to or greater than 2 mPa·s and equal to or less than 20 mPa·s.

(7)

The method for manufacturing an Al-plated steel sheet used for hot pressing according to any one of (4) to (6),
wherein the application liquid is applied onto the Al plating layer with a roll coater.

(8)

The method for manufacturing an Al-plated steel sheet used for hot pressing according to any one of (4) to (7),
wherein the zinc compound is zinc oxide.

(9)

The method for manufacturing an Al-plated steel sheet used for hot pressing according to any one of (4) to (8),
wherein in the manufactured surface coating layer, the zinc compound is deposited on the Al-plated steel sheet in an amount of equal to or greater than 0.3 g/m² and equal to or less than 1.5 g/m² as an amount of metallic zinc per one surface, and a zinc deposition amount in any continuous 1 mm² region is 1.5 g/m² or less.

(10)

The method for manufacturing an Al-plated steel sheet used for hot pressing according to any one of (4) to (9), wherein an average length RSm of a profile element in a roughness curve of a surface of the manufactured Al-plated steel sheet used for hot pressing after the formation of the surface coating layer is 500 µm or less.

Advantageous Effects of Invention

According to the present invention, a plated steel sheet used for hot pressing that has excellent lubricity in hot state, corrosion resistance after paint coating, and spot weldability can be provided, and productivity in a hot pressing process can be improved.

BRIEF DESCRIPTION OF DRAWINGS

FIG. 1 is a schematic diagram illustrating a Bowden tester.

DESCRIPTION OF EMBODIMENTS

Hereinafter, preferred embodiments of the present invention will be described in detail with reference to the appended drawings.

In the following description, "%" means "mass %" unless otherwise specified.

(Plated Steel Sheet Used for Hot Pressing)

First, description is given on a plated steel sheet used for hot pressing according to an embodiment of the present invention. The plated steel sheet used for hot pressing according to the present embodiment has an Al plating layer formed on one surface or both surfaces of a steel sheet, and a surface coating layer containing a zinc compound is further formed on a surface of the Al plating layer.

<Steel Sheet Before Plating>

As a steel sheet before plating, it is desirable to use a steel sheet having a high mechanical strength (which refers to properties related to mechanical deformation and failure, including, for example, tensile strength, yield point, elongation, contraction of area, hardness, impact value, fatigue strength, creep strength, etc.). Described below is an example of a steel sheet before plating, which is used for the steel sheet used for hot pressing according to the present embodiment.

First, a component composition will be described.

The component composition of the steel sheet before plating preferably contains, in mass %, C: 0.1 to 0.4%, Si: 0.01 to 0.6%, and Mn: 0.5 to 3%. Furthermore, the component composition of the steel sheet before plating may contain at least one of Cr: 0.05 to 3.0%, V: 0.01 to 1.0%, Mo: 0.01 to 0.3%, Ti: 0.01 to 0.1%, and B: 0.0001 to 0.1%. The balance of the component composition of the steel sheet before plating includes Fe and impurities.

[C: 0.1 to 0.4%]

C is contained to secure a desired mechanical strength of the steel sheet. A content of C of less than 0.1% does not provide enough mechanical strength. In contrast, the C content exceeding 0.4% makes the steel sheet harden but is more likely to cause melting cracks. Accordingly, the C content is preferably 0.1 to 0.4%.

[Si: 0.01 to 0.6%]

Si is an element for improving the mechanical strength of the steel sheet and is contained to secure a desired mechanical strength of the steel sheet in a way similar to C. If the Si content is less than 0.01%, it is difficult to exhibit a strength-improving effect and obtain mechanical strength improved enough. Si is also an element that is easily oxidized and thus Si content exceeding 0.6% lowers wettability during hot-dip Al plating, which is likely to cause the generation of non-plated portions. Accordingly, the Si content is preferably 0.01 to 0.6%.

[Mn: 0.5 to 3%]

Mn is an element for improving the mechanical strength of the steel sheet and also an element for increasing hardenability. Mn is also effective in preventing hot-brittleness caused by S, which is an impurity. A content of Mn of less than 0.5% does not provide such effects. In contrast, the Mn content exceeding 3% may lower strength due to residual γ-phase becoming excessive. Accordingly, the Mn content is preferably 0.5 to 3%.

[Cr: 0.05 to 3.0%]
[V: 0.01 to 1.0%]
[Mo: 0.01 to 0.3%]

Cr, V, and Mo are elements for improving mechanical properties of the steel sheet and also an element for suppressing generation of pearlite during cooling from an annealing temperature. A content of Cr of less than 0.05%, a content of V of less than 0.01%, or a content of Mo of less than 0.01% does not provide such effects. In contrast, the Cr content exceeding 3.0%, the V content exceeding 1.0%, or the Mo content exceeding 0.3% makes an area ratio of hard phase excessive and causes deterioration in formability. Accordingly, the Cr content is preferably 0.05 to 3.0%, the V content is preferably 0.01 to 1.0%, and the Mo content is preferably 0.01 to 0.3%.

[Ti: 0.01 to 0.1%]

Ti is an element for improving the mechanical strength of the steel sheet and also an element for improving the heat resistance of the Al plating layer. A Ti content of less than 0.01% cannot provide a mechanical-strength-improving effect or an oxidation-resistance-improving effect. In contrast, Ti may soften steel by forming carbides and nitrides if contained excessively. In particular, if the Ti content exceeds 0.1%, a desired mechanical strength cannot be obtained. Accordingly, the Ti content is preferably 0.01 to 0.1%.

[B: 0.0001 to 0.1%]

B is an element for improving strength by contributing to quenching. A content of B of less than 0.0001% does not provide such strength-improving effect. In contrast, the B content exceeding 0.1% may lower fatigue strength by forming inclusions in the steel sheet and causing embrittlement. Accordingly, the B content is preferably 0.0001 to 0.1%.

[Optionally Added Element]

The component composition of the steel sheet before plating described above is merely an example, and another component composition may be employed. For example, the component composition of the steel sheet before plating may contain, as a deoxidation element, Al: 0.001 to 0.08%. In addition, the component composition of the steel sheet before plating may contain impurities that are inevitably mixed in from manufacturing processes, etc.

A steel sheet before plating with such a component composition is quenched after heated by, for example, a hot pressing method, so that the steel sheet may have a tensile strength of approximately 1500 MPa or more, even after plating. Although the steel sheet has such a high tensile strength, when the hot pressing method is used, it can be shaped easily in a softened state by heating. Moreover, the obtained product can have a high mechanical strength, and the steel sheet can maintain or improve the mechanical strength even if its thickness is reduced for the purpose of weight reduction.

<Al Plating Layer>

The Al plating layer is formed on one surface or both surfaces of the steel sheet before plating. The deposition amount of this Al plating layer is preferably, for example, 20 g/m$^2$ to 120 g/m$^2$ per one surface. The Al plating layer is formed on one surface or both surfaces of the steel sheet by a hot-dip plating method, for example; the method for forming the Al plating layer is not limited thereto.

The component composition of the Al plating layer may be any component composition containing at least 50 mass % of Al, and includes a component composition to which an element other than Al is added to improve characteristics of the plating layer. Although the element other than Al is not particularly limited, Si may be contained positively in the Al plating layer for the following reason.

When Si is contained in the Al plating layer, an Al—Fe—Si alloy layer is generated at the interface between the plating and base iron, suppressing generation of a weak Al—Fe alloy layer during hot-dip plating. A Si content of less than 3% makes an Al—Fe alloy layer grow thick at the stage of applying Al plating, thus promoting crack development in the plating layer during work, which may adversely affect corrosion resistance. A Si content exceeding 15%, on the other hand, increases the volume ratio of a layer containing Si, and may cause a decrease in the workability and corrosion resistance of the plating layer. Accordingly, the Si content in the Al plating layer is preferably 3% to 15%.

The Al plating layer prevents corrosion of the steel sheet used for hot pressing according to the present embodiment. In addition, in the case where the steel sheet for hot pressing according to the present embodiment is subjected to work by the hot pressing method, the surface is not oxidized to generate scales (iron compounds) even when the steel sheet is heated to a high temperature. The Al plating layer preventing generation of scales allows omission of such processes as scale removing, surface cleaning, and surface treatment, and thus can improve the productivity of products. The Al plating layer has the boiling point and melting point higher than those of a plating cover formed by organic-based materials or by other metal-based materials (e.g., a zinc-based material). This allows the steel sheet to be shaped at high temperature in the shaping work using the hot pressing method, because the cover does not evaporate, which leads to further improvement in formability during the hot pressing, leading to easiness in shaping.

The Al plating layer can be alloyed with Fe contained in the steel sheet, by heating during hot-dip plating and hot pressing. Accordingly, the Al plating layer is not necessarily formed as one single layer having a constant component composition, and may contain a partially alloyed layer (alloy layer) therein.

<Surface Coating Layer>

The surface coating layer is formed on the surface of the Al plating layer. The surface coating layer contains a zinc compound. Examples of the zinc compound include various compounds, such as zinc oxide, zinc hydroxide, zinc sulfate, zinc nitrate, zinc phosphate, zinc acetate, zinc citrate, zinc oxalate, zinc oleate, and zinc gluconate; it is particularly preferable to use zinc oxide. These zinc compounds provide an effect of improving lubricity during hot pressing and reactivity in the reaction with a chemical conversion liquid. The surface coating layer may contain only one kind of these zinc compounds, or may use a plurality of zinc compounds in mixture.

Described below is an example in which the surface coating layer contains zinc oxide. It should be noted that the same description applies to a case where the surface coating layer contains any of the above zinc compounds other than zinc oxide.

The surface coating layer containing zinc oxide can be formed on the Al plating layer through, for example, a process of applying a paint containing zinc oxide particles and a hardening process by baking and drying after the application. Examples of a method for applying zinc oxide include a method in which a sol containing zinc oxide is mixed with a predetermined organic binder and applied onto the surface of the aluminum plating layer, and a method of applying by powder coating. The predetermined organic binder may be, for example, polyurethane resin, polyester resin, acrylic resin, or a silane coupling agent. These organic binders are water-soluble so as to be dissolved with the sol containing zinc oxide. An application liquid obtained in this manner is applied onto the surface of the aluminum-plated steel sheet.

The size of zinc oxide is not particularly limited, but the size is preferably, for example, approximately 50 nm to 300 nm in diameter. The grain size of zinc oxide includes two types, the grain size of powder itself, and the grain size in the sol when powder is made into a sol; in the present embodiment, the grain size in the sol is described. In general, subsequent precipitation of fine powder occurs in the sol, which makes the grain size in the sol larger than the grain size of powder itself. When the grain size of powder itself is less than 50 nm, kneading is difficult, and also subsequent precipitation easily occurs, resulting in coarsening. Therefore, it is practically difficult to make the grain size in the sol less than 50 nm. When the grain size in the sol exceeds 300 nm, particles easily precipitate, which causes unevenness. The grain size in the sol of zinc oxide is further preferably approximately 50 nm to 150 nm. Note that the grain size in the sol of zinc oxide can be measured by a known method, such as a dynamic light scattering method, an induced grating method, or a laser diffraction and scattering method.

A content of the binder component, such as a resin component and/or a silane coupling agent, in the surface coating is preferably approximately 5 to 30% as a mass ratio of the binder component to zinc oxide. A binder content of less than 5% does not provide the binder effect sufficiently and tends to cause the separation of the paint coat, and further, as will be described later, may greatly affect lubricity because holes do not occur after organic solvent evaporation. To obtain the binder effect stably, it is more preferable to contain the binder component at a mass ratio of 10% or more. On the other hand, if the content of the binder component exceeds 30%, odor generation during heating becomes noticeable, which is not preferable.

It has also been found that the content of the binder component in the above range improves surface lubricity during hot pressing. This is presumably because the evaporation of the organic solvent of the binder at the heating stage causes holes to occur in the zinc oxide coating, bringing zinc oxide having a lubricating effect and die metal into point contact.

A deposition amount of zinc oxide needs to be equal to or greater than 0.3 g/m$^2$ and equal to or less than 1.5 g/m$^2$ as an amount of metallic zinc per one surface of the steel sheet. If the deposition amount of zinc oxide is less than 0.3 g/m$^2$ of metallic zinc per one surface of the steel sheet, lubricity in hot state and corrosion resistance after paint coating are not enough. If the deposition amount of zinc oxide exceeds 1.5 g/m² of metallic zinc per one surface of the steel sheet, the thickness of the surface coating layer becomes excessive, which deteriorates spot weldability. Accordingly, for the surface coating layer on one side, zinc oxide needs to be formed on the surface of the aluminum plating layer with a deposition amount of equal to or greater than 0.3 g/m² and equal to or less than 1.5 g/m² as an amount of metallic zinc. In particular, the deposition amount of zinc oxide is preferably approximately 0.6 g/m² to 1.0 g/m² as an amount of metallic zinc; in such a range, lubricity during hot pressing can be secured and weldability is favorable.

Here, the deposition amount of the zinc compound can be measured as an amount of metallic zinc by a known method, such as fluorescent X-ray spectroscopy. For example, a sample whose deposition amount of metallic zinc is already known is used, a calibration curve indicating the relation between fluorescent X-ray intensity and deposition amount is created in advance, and the deposition amount of metallic zinc is determined from the measurement result of fluorescent X-ray intensity, by using the calibration curve.

Furthermore, for zinc oxide, it is necessary that the deposition amount of zinc in any continuous 1 mm² region does not exceed 1.5 g/m². If the deposition amount of zinc oxide in any continuous 1 mm² micro region exceeds 1.5 g/m², an imbalance is caused in current distribution at the time of spot welding, which deteriorates weldability. Note that the value of the deposition amount of zinc in any continuous 1 mm² region is not particularly prescribed as long as it is 1.5 g/m² or less. The lower limit value of the deposition amount of zinc in any continuous 1 mm² region is not particularly prescribed, but is preferably, for example, 0.3 g/m² or greater.

Here, the deposition amount of zinc in any continuous 1 mm² region means the maximum deposition amount of zinc in a measured area, obtained by performing mapping analysis of zinc distribution on the surface of the Al-plated steel sheet by using an electron probe microanalyser (EPMA). The measurement area is set to 1 mm² or greater, and the measurement pitch is set to equal to or greater than 10 μm and equal to or less than 100 μm. Performing mapping analysis with the measurement area and measurement pitch decided makes it possible to find whether the zinc compound is uniformly deposited on the surface of the Al-plated steel sheet.

Such a surface coating layer containing zinc oxide can improve the lubricity of the plated steel sheet. In particular, the surface coating layer containing zinc oxide can further improve lubricity and further improve formability and productivity, as compared with the coating made of an inorganic compound containing at least one of Si, Zr, Ti, and P, an organic compound, or a complex compound thereof disclosed in Patent Literature 2.

An average length RSm of a profile element in a roughness curve of the surface of the Al-plated steel sheet used for hot pressing according to the present embodiment after the formation of the surface coating is preferably 500 μm or less. When RSm is 500 μm or less, current distribution at the time of spot welding is further dispersed and improvement in weldability can be expected, which is preferable. To make RSm 500 μm or less, any method may be used; for example, the Al-plated steel sheet before the formation of the coating may be subjected to skin pass depression. This RSm is further preferably equal to or greater than 50 μm and equal to or less than 300 μm. The value of RSm is preferably as small as possible, but RSm of less than 50 μm requires a large cost to achieve the value, while producing little effect. Note that since Al plating melts during hot pressing, it seems meaningless to control RSm to improve spot weldability after heating; however, during heating, the binder component in the surface coating burns to leave only zinc oxide before the plating melts, and zinc oxide forms the coating with a shape reflecting the unevenness of the base (that is, the Al plating surface). Accordingly, it is effective to control RSm of the Al plating surface. Note that the average length RSm of the profile element in the roughness curve of the surface after the formation of the surface coating can be measured in accordance with JIS B0633 and JIS B 0601, by using a known surface roughness measuring machine.

The reason for the surface coating layer containing zinc oxide being able to improve lubricity is presumably the melting point of zinc oxide. That is, the melting point of zinc oxide is approximately 1975° C., which is higher than the melting point (approximately 660° C.) of the aluminum plating layer. Therefore, even if the steel sheet is heated to 800° C. or higher, for example, when the plated steel sheet is subjected to work by the hot pressing method, the surface coating layer containing zinc oxide does not melt. This suppresses adhesion to dies, thus cutting the process to remove Al—Fe powder adhered to the dies and improving productivity.

The surface coating layer containing zinc oxide has excellent corrosion resistance after paint coating presumably because zinc oxide is partly dissolved in a chemical conversion liquid, raises the pH of the plating surface, and forms a chemical conversion coating.

Detailed description has been given above on the zinc compound contained in the surface coating layer, taking zinc oxide as an example. The above-described effects produced by containing zinc oxide are produced similarly also in the case where a zinc compound other than zinc oxide is contained.

(Method for Manufacturing Plated Steel Sheet Used for Hot Pressing)

Next, a method for manufacturing a plated steel sheet used for hot pressing according to an embodiment of the present invention will be described.

In the method for manufacturing a plated steel sheet used for hot pressing according to the present embodiment, an Al-plated steel sheet including a steel sheet and an Al plating layer formed on one surface or both surfaces of the steel sheet is used. Then, onto the Al plating layer of this Al-plated steel sheet, an application liquid containing a zinc compound and having a contact angle of equal to or greater than 20° and equal to or less than 50° with respect to the Al-plated steel sheet is applied. After that, the Al-plated steel sheet onto which the application liquid has been applied is dried at a peak metal temperature of equal to or higher than 60° C. and equal to or lower than 200° C., so that a surface coating layer containing the zinc compound is formed on the Al plating layer.

As the application liquid used for forming the surface coating layer containing the zinc compound, a mixture of a sol containing the zinc compound and a predetermined organic binder can be used as described above.

Here, the contact angle of the application liquid with respect to the plated steel sheet having the Al plating layer is set to equal to or greater than 20° and equal to or less than 50°; thus, the application liquid can be uniformly deposited on the Al plating layer, which improves the lubricity in hot state, corrosion resistance after paint coating, and spot weldability of the formed surface coating layer. If the contact angle is less than 20°, the application liquid easily runs by gravity, and is affected by unevenness due to the surface roughness of the steel sheet having the Al plating layer, the application liquid becoming thin at convex parts and thick at concave parts. This inhibits uniform deposition of the zinc compound. If the contact angle exceeds 50°, the application liquid is repelled by the steel sheet having the Al plating layer, which inhibits uniform deposition of the zinc compound. The contact angle of the application liquid is further preferably equal to or greater than 25° and equal to or less than 40°.

Note that the contact angle herein refers to an angle that is inside the liquid and is formed between the liquid surface and the solid surface, at a place where the free surface of a still liquid is in contact with a solid wall. This contact angle can be measured by, as a known method, using Young's formula and using a contact angle gauge (e.g., DM-901, available from Kyowa Interface Science Co., LTD.), for example.

The contact angle of the application liquid can be controlled by, for example, making the above application liquid contain a solvent, such as water or ethyl alcohol, or an additive (e.g., Surfynol 104E available from Nissin Chemical Industry Co., Ltd. or Aron B500 available from TOAGOSEI CO., LTD.) as appropriate.

The surface tension and viscosity of the application liquid are not particularly limited, but the surface tension of the application liquid is preferably equal to or greater than 20 mN/m and equal to or less than 60 mN/m, and the viscosity of the application liquid is preferably equal to or greater than 2 mPa·s and equal to or less than 20 mPa·s. The surface tension and viscosity of the application liquid in the above ranges allow the application liquid to be deposited further uniformly, which further improves lubricity in hot state, corrosion resistance after paint coating, and spot weldability. The surface tension of the application liquid is further preferably equal to or greater than 30 mN/m and equal to or less than 50 mN/m, and the viscosity of the application liquid is further preferably equal to or greater than 2.5 mPa·s and equal to or less than 10 mPa·s.

Here, the above surface tension is a value obtained by adjusting the temperature of the application liquid to 25° C. and performing measurement by a Wilhelmy method (e.g., CBVP-A3, available from Kyowa Interface Science Co., LTD.). The above viscosity is a value obtained by adjusting the temperature of the application liquid to 25° C. and performing measurement with a B-type viscometer (e.g., VDA2-L, available from Shibaura Systems Co., Ltd.).

The surface tension and viscosity of the application liquid can be controlled by, for example, making the above application liquid contain a solvent, such as water or ethyl alcohol, or an additive (Surfynol 104E available from Nissin Chemical Industry Co., Ltd. or Aron B500 available from TOAGOSEI CO., LTD.) as appropriate.

In applying the application liquid onto the Al plating layer, it is preferable to use a roll coater. Application conditions with the roll coater are not particularly limited, but for example, a method may be used in which a pick up roll and an applicator roll are used for application. When the application liquid is applied onto the Al plating layer by this method, the application liquid can be uniformly deposited on the Al plating layer, which further improves lubricity in hot state, corrosion resistance after paint coating, and spot weldability.

As a method for baking and drying after the application, methods including, for example, an air-heating furnace, an induction heating furnace, a near infrared ray furnace, and the like may be used, or a combination of any of these methods may be used. Here, the peak metal temperature of the steel sheet in baking and drying is set to equal to or higher than 60° C. and equal to or lower than 200° C. The peak metal temperature (PMT) of the steel sheet of lower than 60° C. is not preferable because the surface coating layer may come off. The peak metal temperature of the steel sheet exceeding 200° C. is not preferable because a crack may occur in the surface coating layer and the surface coating layer may come off. The peak metal temperature of the steel sheet is preferably equal to or higher than 70° C. and equal to or lower than 150° C.

Other hardening treatments may be carried out, depending on the type of binder to be used for the application liquid, by using, for example, ultraviolet ray, electron beam, or the like instead of baking and drying after the application. Examples of an organic binder that can be subjected to such hardening treatments include polyurethane, polyester, acrylic, and a silane coupling agent.

The method for forming the surface coating layer containing the zinc compound is not limited to these examples, and the surface coating layer can be formed by various methods. When the binder is not used, the adhesion after applied onto the Al plating is slightly low and the surface coating layer may partially come off when rubbed strongly. However, once heated by going through a hot pressing process, the surface coating layer exhibits strong adhesion.

The method for manufacturing the Al-plated steel sheet used for hot pressing according to the present embodiment has been described above.

EXAMPLES

The Al-plated steel sheet used for hot pressing and the method for manufacturing the Al-plated steel sheet used for hot pressing according to the present invention will now be described specifically by showing the examples and comparative examples. Note that the Examples of the Al-plated steel sheet used for hot pressing and the method for manufacturing the Al-plated steel sheet used for hot pressing according to the present invention, which are described below, are merely exemplary, and the Al-plated steel sheet used for hot pressing and the method for manufacturing the Al-plated steel sheet used for hot pressing according to the present invention are not limited to such examples as described below.

Example 1

In Example 1 described below, a cold-rolled steel sheet (sheet thickness of 1.4 mm) having steel components as shown in Table 1 was used, and the surfaces of the cold-rolled steel sheet were Al-plated by a Sendzimir method. The annealing temperature used was approximately 800° C. Si of 9% was contained in the Al plating bath and also Fe that had been eluted from steel strips was contained therein. The deposition amount after plating was adjusted to 80 g/m$^2$ for both surfaces, by a gas wiping method, and after cooling, an application liquid containing any one of zinc oxide, zinc hydroxide, and zinc acetate was applied with a roll coater, and dried at a peak metal temperature shown in Table 2.

The contact angle, surface tension, and viscosity of the used application liquid were as shown in Table 1 below. Here, the contact angle, surface tension, and viscosity of the application liquid were adjusted by adding water, and Surfynol 104E and/or Aron B500 to the application liquid.

Each prepared steel sheet had a final sheet thickness of 1.6 mm. The lubricity in hot state, corrosion resistance after paint coating, and spot weldability of the prepared steel sheet were evaluated. In the evaluation, an Al-plated steel sheet without a coating was used for comparison. Some samples were subjected to skin pass depression before formation of the coating, so that a surface form (RSm) of the Al plating was changed.

A zinc deposition amount was determined by fluorescent X-ray spectroscopy, as the average deposition amount in a 30 mm×30 mm region. Furthermore, mapping analysis using an electron probe microanalyser (JEOL JXA-8530F) was performed on a portion where zinc was deposited in a 5 mm×5 mm region, and the presence/absence of a portion having a zinc deposition amount exceeding 1.5 g/m$^2$ in any continuous 1 mm$^2$ region in an analyzed region was evaluated. Here, the measurement area was 5 mm×5 mm, the measurement pitch was 20 μm, the acceleration voltage of an electron beam was 15 kV, irradiation current was 50 nA, the beam diameter was 20 μm, and the measurement time for each measurement pitch was 50 ms. RSm was measured with a surface roughness measuring machine (SE3500, available from Kosaka Laboratory Ltd.). The grain size in a sol of the zinc compound was measured by a dynamic light scattering method using Nanotrac Wave available from NIKKISO CO., LTD.

TABLE 1

| Steel member components (unit: mass %) | | | | | | | |
|---|---|---|---|---|---|---|---|
| C | Si | Mn | P | S | Ti | B | Al |
| 0.2 | 0.1 | 1.2 | 0.02 | 0.01 | 0.02 | 0.003 | 0.04 |

Lubricity in hot state was evaluated with a Bowden tester shown in FIG. 1. A 150×200 mm steel sheet was heated to 900° C., then steel ball was pressed from above at 700° C., pressing load and pull-out load were measured, and a value was calculated from pull-out load/pressing load, as a coefficient of dynamic friction.

For corrosion resistance after paint coating, a method prescribed in JASO M609 established by Society of Automotive Engineers of Japan, Inc. was carried out.

First, each prepared Al-plated steel sheet was placed in a heating furnace and heated at 900° C. for 6 minutes. Immediately after taken out, the Al-plated steel sheet was held between stainless steel dies and rapidly cooled. The cooling rate was approximately 150° C. per second. Next, the cooled Al-plated steel sheet was sheared into 70×150 mm, subjected to chemical conversion treatment using a chemical conversion liquid (PB-SX35T) available from Nihon Parkerizing Co., Ltd., and then coated with an electrodeposition paint (POWERNIX 110) available from NIPPONPAINT Co., Ltd. with a target thickness of 20 and baking was performed at 170° C. After that, the paint coat was cross-cut with a cutter and was subjected to a corrosion test of 180 cycles (60 days). The width of blistering of the paint coat from the cross-cut (maximum value on one side) was then measured.

Spot weldability was evaluated as follows.

Each prepared Al-plated steel sheet was placed in a heating furnace and heated at 900° C. for 6 minutes. Immediately after taken out, the Al-plated steel sheet was held between stainless steel dies and rapidly cooled. The cooling rate was approximately 150° C. per second. Next, the cooled Al-plated steel sheet was sheared into 30×50 mm, and a suitable spot welding current range (upper limit current-lower limit current) was measured. Measurement conditions are listed below. The lower limit current was defined as a current value at which a nugget diameter became 4×(sheet thickness)$^{0.5}$, specifically at which the nugget diameter became 5.1 mm, and the upper limit current was defined as a current at which expulsion occurred.

Current: direct current
Electrode: made of copper-chromium alloy, DR (40R with 6 mm in tip diameter)
Pressure application: 400 kgf (1 kgf is approximately 9.8 N)
Current applying time: 240 msec Table 2 below shows the obtained evaluation results. In Table 2, "organic acid zinc" means zinc citrate.

TABLE 2

| | | Evaluation results | | | | | | |
|---|---|---|---|---|---|---|---|---|
| NO. | Type of zinc compound in coating | Contact angle of application liquid/ degrees | Surface tension of application liquid/ mN · m$^{-1}$ | Viscosity of application liquid/ mPa · s | Peak metal temperature in drying application liquid/ ° C. | Binder component content/% | Grain size in sol of zinc compound/ nm | Deposition amount of zinc compound (Zn amount basis)/ g · m$^{-2}$ |
| 1 | — (no coating) | — | — | — | — | — | — | — |
| 2 | zinc oxide | 26 | 27 | 6.1 | 70 | 20 | 60 | 0.8 |
| 3 | zinc hydroxide | 25 | 26 | 8.4 | 70 | 25 | 70 | 0.8 |
| 4 | zinc phosphate | 30 | 31 | 5.5 | 80 | 25 | 60 | 0.8 |
| 5 | organic acid zinc | 27 | 28 | 5.2 | 80 | 25 | 60 | 0.8 |
| 6 | zinc acetate | 29 | 33 | 8 | 80 | 25 | 55 | 0.8 |
| 7 | zinc oxide | 35 | 38 | 4.2 | 80 | 30 | 60 | 0.2 |
| 8 | zinc oxide | 34 | 37 | 5.2 | 150 | 20 | 50 | 0.3 |
| 9 | zinc oxide | 27 | 29 | 4.2 | 150 | 20 | 70 | 0.6 |
| 10 | zinc oxide | 26 | 31 | 6.4 | 150 | 25 | 60 | 1.0 |
| 11 | zinc oxide | 35 | 40 | 4.1 | 150 | 25 | 60 | 1.5 |
| 12 | zinc oxide | 27 | 29 | 8.5 | 200 | 5 | 60 | 0.6 |
| 13 | zinc oxide | 27 | 31 | 5 | 200 | 30 | 60 | 0.6 |
| 14 | zinc oxide | 31 | 34 | 4.5 | 200 | 20 | 150 | 0.6 |
| 15 | zinc oxide | 30 | 35 | 5.8 | 200 | 20 | 300 | 0.6 |
| 16 | zinc oxide | 30 | 34 | 18.8 | 80 | 25 | 60 | 1.5 |
| 17 | zinc oxide | 27 | 28 | 6.6 | 80 | 20 | 60 | 2.0 |
| 18 | zinc oxide | 17 | 18 | 4.5 | 80 | 20 | 70 | 0.8 |
| 19 | zinc oxide | 32 | 33 | 7.4 | 80 | 20 | 60 | 0.8 |
| 20 | zinc oxide | 31 | 34 | 6.4 | 80 | 25 | 50 | 0.8 |

TABLE 2-continued

Evaluation results

| | | | | | | | | |
|---|---|---|---|---|---|---|---|---|
| 21 | zinc oxide | 26 | 28 | 14.3 | 80 | 25 | 60 | 0.8 |
| 22 | zinc oxide | 53 | 63 | 8.9 | 80 | 20 | 60 | 0.8 |
| 23 | zinc oxide | 31 | 32 | 21.5 | 80 | 25 | 70 | 0.8 |
| 24 | zinc oxide | 22 | 31 | 1.5 | 80 | 20 | 70 | 0.8 |

| NO. | Presence/absence of portion having Zn deposition amount exceeding 1.5 g/m² in any continuous 1 mm² region | RSm/ μm | Lubricity in hot state (coefficient of dynamic friction) | Corrosion resistance after paint coating (width of blistering of paint coat)/ mm | Spot weldability (suitable current range)/ kA | Remarks |
|---|---|---|---|---|---|---|
| 1 | — | 300 | 0.9 | 10 | 2.2 | Comparative Example |
| 2 | absent | 300 | 0.6 | 2 | 1.9 | Example |
| 3 | absent | 300 | 0.7 | 5 | 1.8 | Example |
| 4 | absent | 400 | 0.6 | 2 | 1.9 | Example |
| 5 | absent | 400 | 0.6 | 3 | 2.0 | Example |
| 6 | absent | 300 | 0.7 | 6 | 1.8 | Example |
| 7 | absent | 300 | 0.7 | 9 | 1.9 | Comparative Example |
| 8 | absent | 300 | 0.7 | 5 | 1.9 | Example |
| 9 | absent | 300 | 0.7 | 2 | 1.9 | Example |
| 10 | absent | 300 | 0.6 | 2 | 1.9 | Example |
| 11 | absent | 300 | 0.6 | 2 | 1.6 | Example |
| 12 | absent | 300 | 0.6 | 2 | 1.5 | Example |
| 13 | absent | 300 | 0.6 | 2 | 1.6 | Example |
| 14 | absent | 300 | 0.6 | 2 | 1.6 | Example |
| 15 | absent | 300 | 0.6 | 2 | 1.5 | Example |
| 16 | absent | 300 | 0.6 | 2 | 1.6 | Example |
| 17 | absent | 300 | 0.6 | 2 | 0.6 | Comparative Example |
| 18 | present | 300 | 0.6 | 2 | 0.7 | Comparative Example |
| 19 | absent | 100 | 0.6 | 2 | 2.0 | Example |
| 20 | absent | 450 | 0.6 | 2 | 1.9 | Example |
| 21 | absent | 600 | 0.6 | 2 | 1.6 | Example |
| 22 | present | 300 | 0.6 | 2 | 0.5 | Comparative Example |
| 23 | present | 300 | 0.6 | 2 | 0.6 | Comparative Example |
| 24 | present | 300 | 0.6 | 2 | 0.7 | Comparative Example |

Nos. 2 to 6 having a coating layer containing a zinc compound on the Al plating surface had excellent lubricity and corrosion resistance after paint coating, and spot weldability on a similar level, as compared with No. 1 not having a coating, exhibiting favorable performance. Especially, No. 2, whose zinc compound was zinc oxide, was found to have better performance than other samples.

No. 7 and No. 17, which had a coating layer containing zinc oxide but had a deposition amount of zinc oxide (zinc amount basis) falling outside the range of the present invention, exhibited poor corrosion resistance or poor spot weldability. In the case where the deposition amount of zinc oxide (zinc amount basis) was equal to or greater than 0.6 g/m² and equal to or less than 1.0 g/m² (No. 2, No. 9, and No. 10), particularly favorable performance was exhibited. In the case where the deposition amount of zinc oxide was within the range of the present invention but there existed a portion having a zinc deposition amount in any continuous 1 mm² region exceeding 1.5 g/m² (No. 18), poor spot weldability was exhibited. It was also found that, if the deposition amount (Zn amount basis) is the same, RSm of 500 μm or less is preferable because favorable spot weldability is exhibited.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

INDUSTRIAL APPLICABILITY

As described above, by uniformly depositing a zinc compound, particularly zinc oxide, with a deposition amount within a certain range on a surface of an Al-plated steel sheet, it is possible to significantly improve spot weldability while securing lubricity in hot state and corrosion resistance after paint coating. Accordingly, the present invention can enhance the applicability of an aluminum-plated steel member to automobiles and industrial machines, which are end-uses, thus being highly useful in industry.

The invention claimed is:

1. An Al-plated steel sheet used for hot pressing, comprising:
    a steel sheet;
    an Al plating layer formed on one surface or both surfaces of the steel sheet; and
    a surface coating layer formed on the Al plating layer,
        wherein the surface coating layer contains a zinc compound, and the zinc compound is deposited on the Al-plated steel sheet in an amount of equal to or greater than 0.3 g/m² and equal to or less than 1.5 g/m² as an amount of metallic zinc per one surface, and a zinc deposition amount in any continuous 1 mm² region is 1.5 g/m² or less.

2. The Al-plated steel sheet used for hot pressing according to claim 1,
wherein the zinc compound in the surface coating layer is zinc oxide.

3. The Al-plated steel sheet used for hot pressing according to claim 1,
wherein an average length RSm of a profile element in a roughness curve of a surface of the Al-plated steel sheet used for hot pressing after the formation of the surface coating layer is 500 μm or less.

4. The Al-plated steel sheet used for hot pressing according to claim 2,
wherein an average length RSm of a profile element in a roughness curve of a surface of the Al-plated steel sheet used for hot pressing after the formation of the surface coating layer is 500 μm or less.

5. A method for manufacturing the Al-plated steel sheet used for hot pressing according to claim 1,
said method comprising the steps of:
applying an application liquid containing a zinc compound and having a contact angle of equal to or greater than 20° and equal to or less than 50° with respect to the Al-plated steel sheet onto the Al-plated steel sheet including a steel sheet and the Al plating layer formed on one surface or both surfaces of the steel sheet; and
drying the Al-plated steel sheet onto which the application liquid has been applied, at a peak metal temperature of equal to or higher than 60° C. and equal to or lower than 200° C., to form a surface coating layer containing the zinc compound on the Al plating layer.

6. The method for manufacturing the Al-plated steel sheet used for hot pressing according to claim 5,
wherein a surface tension of the application liquid at 25° C. is equal to or greater than 20 mN/m and equal to or less than 60 mN/m.

7. The method for manufacturing the Al-plated steel sheet used for hot pressing according to claim 5,
wherein a viscosity of the application liquid at 25° C. is equal to or greater than 2 mPa·s and equal to or less than 20 mPa·s.

8. The method for manufacturing the Al-plated steel sheet used for hot pressing according to claim 6,
wherein a viscosity of the application liquid at 25° C. is equal to or greater than 2 mPa·s and equal to or less than 20 mPa·s.

9. The method for manufacturing the Al-plated steel sheet used for hot pressing according to claim 5,
wherein the application liquid is applied onto the Al plating layer with a roll coater.

10. The method for manufacturing the Al-plated steel sheet used for hot pressing according to claim 5,
wherein the zinc compound is zinc oxide.

11. The method for manufacturing the Al-plated steel sheet used for hot pressing according to claim 5,
wherein an average length RSm of a profile element in a roughness curve of a surface of the manufactured Al-plated steel sheet used for hot pressing after the formation of the surface coating layer is 500 μm or less.

* * * * *